US012674490B2

(12) United States Patent (10) Patent No.: US 12,674,490 B2

Bertolini et al. (45) Date of Patent: Jul. 7, 2026

(54) SUPPORT ASSEMBLY

(71) Applicant: AKTIEBOLAGET SKF, Gothenburg (SE)

(72) Inventors: Andrea A. Bertolini, Carrara (IT); Alessio Nebbia Colomba, Pisa (IT); Renato Berti, Massa (IT)

(73) Assignee: Aktiebolaget SKF, Gothenburg (SE)

( * ) Notice: Subject to any disclaimer, the term of this patent is extended or adjusted under 35 U.S.C. 154(b) by 36 days.

(21) Appl. No.: 18/536,353

(22) Filed: Dec. 12, 2023

(65) Prior Publication Data

US 2024/0209896 A1 Jun. 27, 2024

(30) Foreign Application Priority Data

Dec. 21, 2022 (IT) ........................ 102022000026385

(51) Int. Cl.
F16C 33/78 (2006.01)
F16C 23/08 (2006.01)
F16C 33/80 (2006.01)

(52) U.S. Cl.
CPC ........ F16C 33/7863 (2013.01); F16C 23/084 (2013.01); F16C 33/7886 (2013.01); F16C 33/7889 (2013.01); F16C 33/805 (2013.01)

(58) Field of Classification Search
CPC ............... F16C 33/782; F16C 33/7859; F16C 33/7863; F16C 33/7866; F16C 33/7869; F16C 33/7873; F16C 33/7876; F16C 33/7879; F16C 33/7883; F16C 33/7886; F16C 33/7889; F16C 33/7896; F16C 33/80; F16C 33/805
See application file for complete search history.

(56) References Cited

U.S. PATENT DOCUMENTS 3,499,654 A 3/1970 Lower
4,093,324 A 6/1978 Carrigan
(Continued)

FOREIGN PATENT DOCUMENTS

DE 2839584 3/1980
EP 1065394 1/2001
(Continued)

OTHER PUBLICATIONS

International Search Report for corresponding Italy Patent App. No. 102022000026385 dated May 31, 2023.

*Primary Examiner* — James Pilkington
(74) *Attorney, Agent, or Firm* — Stinson LLP

(57) ABSTRACT

A support assembly includes a casing having an internal assembly seat and a cylindrical seat formed on an axially inner side of the internal assembly seat, a bearing unit mounted within the internal assembly seat of the casing and including a stationary radially outer ring inserted in the assembly seat of the casing and comprising an axially internal annular surface and a rotating radially inner ring. A sealing device interposed between the two rings includes a first shield interference fitted onto a radially outer surface of the radially inner ring and a second shield arranged on an axially inner side of the first shield and interference fit onto the cylindrical seat of the casing. A spacer is positioned axially between the radially outer ring and the second shield, and may be formed separately from or integrally with the second shield.

23 Claims, 4 Drawing Sheets

(56)                    References Cited

U.S. PATENT DOCUMENTS

| | | | |
|---|---|---|---|
| 5,328,276 | A | 7/1994 | Linteau |
| 5,908,248 | A * | 6/1999 | Nisley .................. F16J 15/3256 |
| | | | 384/140 |
| 6,619,851 | B2 * | 9/2003 | Vogelgesang ......... F16C 19/184 |
| | | | 384/488 |
| 7,419,305 | B2 | 9/2008 | Nisley et al. |
| 10,550,888 | B2 * | 2/2020 | Yamada ................ F16C 35/061 |
| 11,867,233 | B2 * | 1/2024 | Baracca .............. F16C 33/7886 |
| 12,241,505 | B2 | 3/2025 | Bertolini et al. |
| 2003/0039422 | A1 | 2/2003 | Nisley et al. |
| 2003/0127803 | A1 | 7/2003 | Yokoyama et al. |
| 2015/0267753 | A1 | 9/2015 | Ciulla |
| 2015/0345562 | A1 | 12/2015 | Varnoux |
| 2018/0100546 | A1 | 4/2018 | Ress |
| 2019/0010989 | A1 | 1/2019 | Falaschi |
| 2022/0325754 | A1 | 10/2022 | Baracca |
| 2023/0265888 | A1 | 8/2023 | Bertolini et al. |

FOREIGN PATENT DOCUMENTS

| | | | |
|---|---|---|---|
| EP | 1245847 | A1 | 10/2002 |
| EP | 2985482 | A2 | 2/2016 |
| EP | 4075003 | | 10/2022 |
| FR | 2515288 | | 4/1983 |
| JP | S5023544 | U | 3/1975 |
| JP | 2003161372 | | 6/2003 |
| JP | 2007132428 | | 5/2007 |
| WO | 2003074888 | | 9/2003 |
| WO | 20140060042 | | 4/2014 |
| WO | 2014060042 | A1 | 4/2024 |

* cited by examiner

SUPPORT ASSEMBLY

CROSS REFERENCE TO RELATED APPLICATIONS

This application is based on and claims priority to Italian Patent Application No. 102022000026385 filed on Dec. 21, 2022, under 35 U.S.C. § 119, the disclosure of which is incorporated by reference herein.

FIELD

The present disclosure relates to a support assembly for a bearing unit. In particular, the present disclosure relates to a support assembly for use in the food industry.

SUMMARY

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiments, a support assembly may include a casing having an internal assembly seat and a cylindrical seat (e.g., surface) formed on an axially inner side of the internal assembly seat, a bearing unit mounted within the internal assembly seat of the casing, and a sealing device. The bearing can include a stationary radially outer ring inserted in the assembly seat of the casing and comprising an axially inner annular surface and a rotating radially inner ring. The sealing device can include a first shield interference fitted onto a radially outer surface of the radially inner ring; a second shield arranged on an axially inner side of the first shield and interference fit onto the cylindrical seat of the casing; and a spacer positioned axially between the radially outer ring and the second shield.

In at least one non-limiting exemplary embodiment, the spacer can include an open ring shape with an opening separating two annular ends of the open ring, the spacer can be received within the assembly seat of the casing in a position axially inside of the radially outer ring, and an outer axial surface of the spacer can abut an axially inner annular surface of the radially outer ring.

In at least one non-limiting exemplary embodiment, the spacer can further include a radially external surface comprising one of a conical shape or spherical shape, and the radially external surface can be configured to slide axially inward along the assembly seat of the casing and contact the second shield in response to a misalignment of the bearing unit within the assembly seat of the casing.

In at least one non-limiting exemplary embodiment, the second shield can be configured to slide in an axially inward direction along the cylindrical seat (e.g., surface) of the casing by up to 2 mm when the spacer contacts the second shield.

In at least one non-limiting exemplary embodiment, the spacer can be separated from the second shield by an axial distance of at least 1 mm.

In at least one non-limiting exemplary embodiment, the spacer can be separated from the first shield by a radial distance of at least 2 mm.

In at least one non-limiting exemplary embodiment, the spacer can further include a pair of holes opposite the opening.

In at least one non-limiting exemplary embodiment, the spacer can be made of a metallic material.

In at least one non-limiting exemplary embodiment, the spacer can be made of polyether ether ketone.

In at least one non-limiting exemplary embodiment, the spacer can include a hardness of at least 80 Shore D.

In at least one non-limiting exemplary embodiment, the second shield can be made of polyether ether ketone.

In at least one non-limiting exemplary embodiment, a support assembly can include a casing having an internal assembly seat and a cylindrical seat formed on an axially inner side of the internal assembly seat; a bearing unit mounted within the internal assembly seat of the casing; and a sealing device. The bearing unit can include a stationary radially outer ring inserted in the assembly seat of the casing and comprising an axially inner annular surface; and a rotating radially inner ring. The sealing device can include a first shield interference fitted onto a radially outer surface of the radially inner ring; a second shield arranged on an axially inner side of the first shield and interference fit onto the cylindrical seat of the casing; and a spacer. The second shield can include a cylindrical portion mounted onto the cylindrical seat of the casing; and a shaped flange portion extending radially inward from the cylindrical portion. The spacer can be formed integrally with an outer axial end of the cylindrical portion, wherein the spacer extends axially outward from the cylindrical mounting portion and beyond an axially outer surface of the shaped flange portion.

In at least one non-limiting exemplary embodiment the spacer can further include a radially inner surface, a radial distance between the radially inner surface of the spacer and the first shield can be at least 2 mm, and an axial distance between the spacer and the radially outer ring can be at least 1 mm.

In at least one non-limiting exemplary embodiment, the second shield can be configured to slide in an axially inward direction along the cylindrical seat (e.g., surface) of the casing by up to 2 mm when the radially outer ring contacts the spacer.

In at least one non-limiting exemplary embodiment, the second shield can have a hardness of at least 80 Shore D.

In at least one non-limiting exemplary embodiment, a support assembly can include: a casing comprising an internal assembly seat and a cylindrical seat formed on an axially inner side of the internal assembly seat; a bearing unit mounted within the internal assembly seat of the casing; and a sealing device. The bearing unit can include a stationary radially outer ring inserted in the assembly seat of the casing and comprising an axially inner annular surface; and a rotating radially inner ring. The sealing device can include a first shield interference fitted onto a radially outer surface of the radially inner ring; and a second shield arranged on an axially inner side of the first shield and interference fit onto the cylindrical seat of the casing. The second shield can include a cylindrical portion mounted onto the cylindrical seat of the casing; a shaped flange portion extending radially inward from the cylindrical portion; and a spacer formed integrally with an outer axial end of the cylindrical portion and a radially outer end of the shaped flange portion. The spacer can include a corner; and a radially outer edge extending from the corner to a radially inner end, wherein an axial thickness of the radially outer edge increases in a radially outward direction from the radially inner end to the corner.

In at least one non-limiting exemplary embodiment, the second shield can be configured to slide in an axially inward direction along the cylindrical seat (e.g., surface) of the casing by up to 2 mm when the spacer contacts the second shield.

In at least one non-limiting exemplary embodiment, the first shield can include a radially outer end separated from the radially inner end of the radially outer edge of the spacer by a radial distance.

In at least one non-limiting exemplary embodiment, the spacer can have a hardness of at least 80 Shore D.

In at least one non-limiting exemplary embodiment, the spacer can be separated from the radially outer ring an axial distance of at least 1 mm.

BRIEF DESCRIPTION OF THE DRAWINGS

The disclosure is described below with reference to the attached drawings, which show some exemplary embodiments of the disclosure, in which.

DETAILED DESCRIPTION

Known support assemblies, particularly those used in the food industry, may be formed by a casing, provided with a fastening flange for fastening to a static frame of a machine, and a bearing unit positioned inside the casing to support a moveable shaft. The bearing unit may form a ball-and-socket coupling with the casing to compensate for any static assembly misalignments between the moveable shaft and the static frame during assembly.

In food industry applications, machinery and the components thereof may be washed frequently for hygienic reasons, which may involve use of somewhat aggressive and corrosive washing fluids. Consequently, the aforementioned known bearing units are also provided with sealing devices, which may be arranged on opposing axial ends of the bearing unit and may include a protective shield integral with the bearing unit and rotating therewith. The sealing device may also create a labyrinth seal to prevent ingress of external contaminants into an interior of the bearing unit.

In these known support assemblies, although known sealing devices offer some protection for the bearing unit, the same is not true of the casing, in particular a rear of the casing on the same side as the frame of the machine, which can still be reached by the washing fluids at relatively high pressures. These washing fluid may penetrate the space between the casing and the bearing unit and adversely affect the service life of the support assembly as a result of oxidization and corrosion. Allowing such penetration of washing fluid may also run afoul of strict hygiene requirements applicable to support assemblies used in food-industry applications, as these liquids can stagnate and produce bacteria and other organic growth unsafe for consumption.

Furthermore, a static misalignment of the rotating shaft and the static frame can occur during mounting of the bearing unit into the casing and onto the rotating shaft. Such misalignment can create contact between rotating components and stationary components, particularly of the sealing device, which leads to additional wear on the components that reduce their operating lives.

Thus, a solution is needed to protect the casing of the support assembly, particularly at the rear portion of the casing, that can also withstand a static assembly misalignment between the rotary shaft and the static frame that causes sliding contact between the stationary and rotating components of the sealing device.

Figure 1:
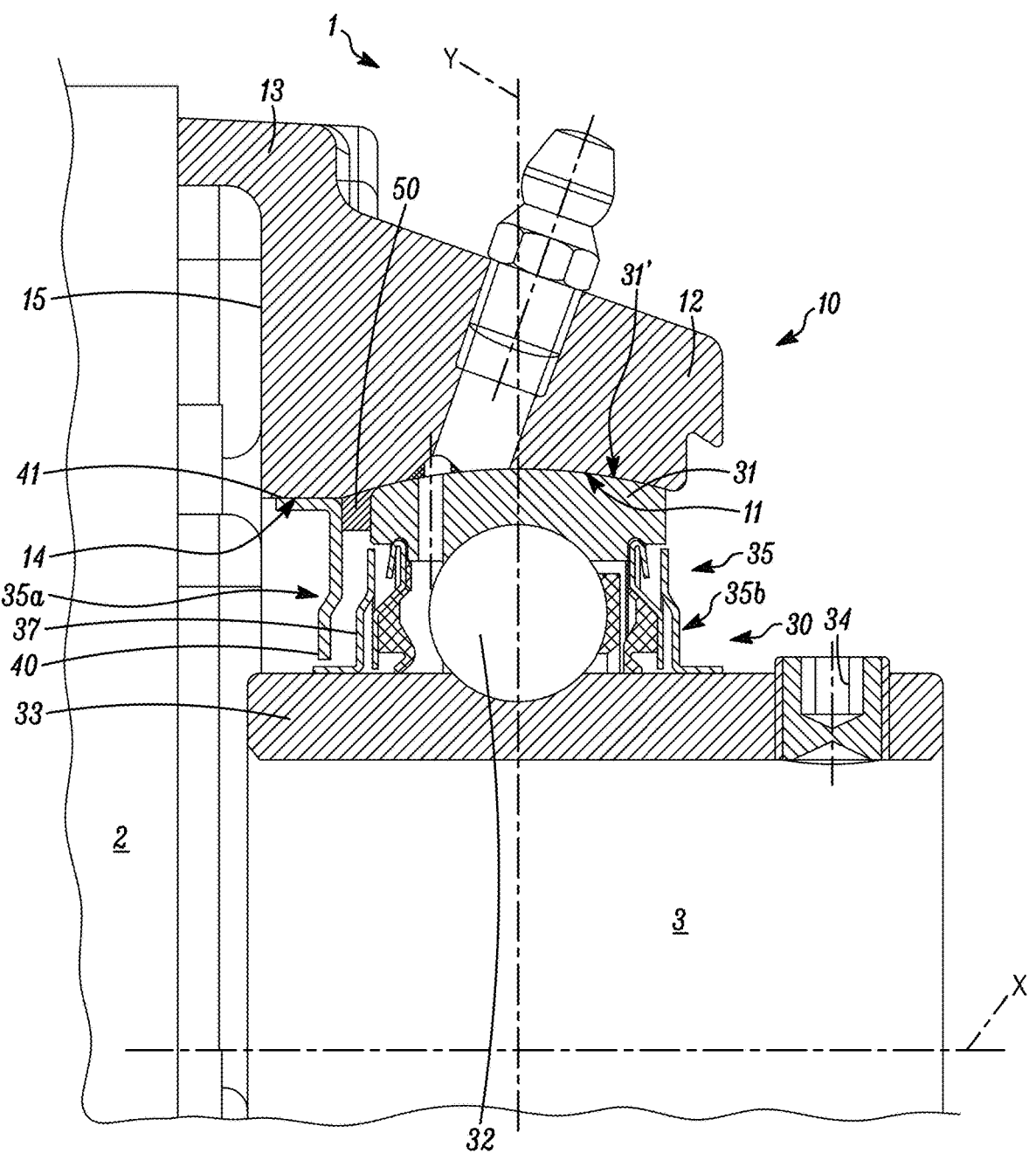
FIG. 1 shows an axial cross section of a support assembly according to exemplary embodiments of the present disclosure.

As illustrated in FIG. 1, in some embodiments, a support assembly 1 may be interposed between a first mechanical element 2 and a second mechanical element 3. In some embodiments, first mechanical element 2 may be a static frame 2 and second mechanical element 3 may be a rotary shaft 3 of a food-industry machine.

In some embodiments, support assembly 1 may include a flanged casing 10 configured to be mounted on first mechanical element 2, (e.g., a static frame 2) and provided with a radially internal assembly seat 11, a bearing unit 30 mounted inside assembly seat 11 to support second mechanical element 3 (e.g., rotary shaft 3), and a pair of sealing devices 35, each sealing device 35a and 35b arranged on an opposing axial end of bearing unit 30 to prevent ingress of washing fluids and other contaminants into an interior of bearing unit 30. In some embodiments, bearing unit 30 may be moveable in relation to mounting seat 11 to withstand any initial static misalignment between first mechanical element 2 and second mechanical element 3 caused during the mounting process.

In some embodiments, flanged casing 10 may include a main tubular body 12 and a flange 13. The casing 10 includes an axially inner end and an opposite axially outer end spaced apart along the axis of rotation X, the axially inner end being adjacent to the first mechanical element 2. Tubular body 12 may be open on opposing axial ends thereof and define an exposed portion of support assembly 1 open away from first mechanical element 2 (e.g., static frame 2) (i.e., in an axially outer direction) and directly exposed to washing fluids and contaminants from an external environment. Flange 13 may be formed integral with tubular body 12 and may be transverse to a central axis X of bearing unit 30. In some embodiments, flange 13 may define an axially inner portion of support assembly 1 (e.g., the axially inner end of the casing 10) formed at an end axially opposite the exposed outer portion of support assembly 1 (e.g., the axially outer end of the casing 10). The axially inner end of support assembly 1 may be exposed to the external environment, although to a lesser degree due to being on the same side as first mechanical element 2 (e.g., static frame 2), which requires protection from ingress of washing liquid and contaminants into the interior of bearing unit 30. In some embodiments, flange 13 may be axially delimited on an axially inner side opposite tubular body 12 by an annular flat surface 15 into which internal cylindrical seat 14 opens.

Throughout the present description and in the claims, terms and expressions indicating positions and orientations, such as "radial" and "axial", are to be understood with reference to central axis of rotation X of the bearing unit 30. "Radial" (e.g., radially) is understood as meaning a direction perpendicular to the axis of rotation X. For example, the terms "radially inner." "radially internal," and "radially inward" refer to a direction toward the axis of rotation X, and the terms "radially outer," "radially outward," and "radially external" refer to a direction away from the axis of rotation. "Axial" (e.g., axially") is understood as meaning a direction parallel to the axis of rotation X. In this disclosure, the terms "axially inner." "axially internal," and "axially inward" refer to a direction extending from the axially outer end of the casing 10 toward the axially inner end of the casing, and the terms "axially outer" and "axially outward" refer to a direction extending from the axially inner end of the casing toward the axially outer end of the casing.

In some embodiments, casing 10 may further include a radially internal cylindrical seat 14 arranged axially adjacent to assembly seat 11. In some embodiments, internal cylindrical seat 14 may be connected to assembly seat 11.

Figure 2:
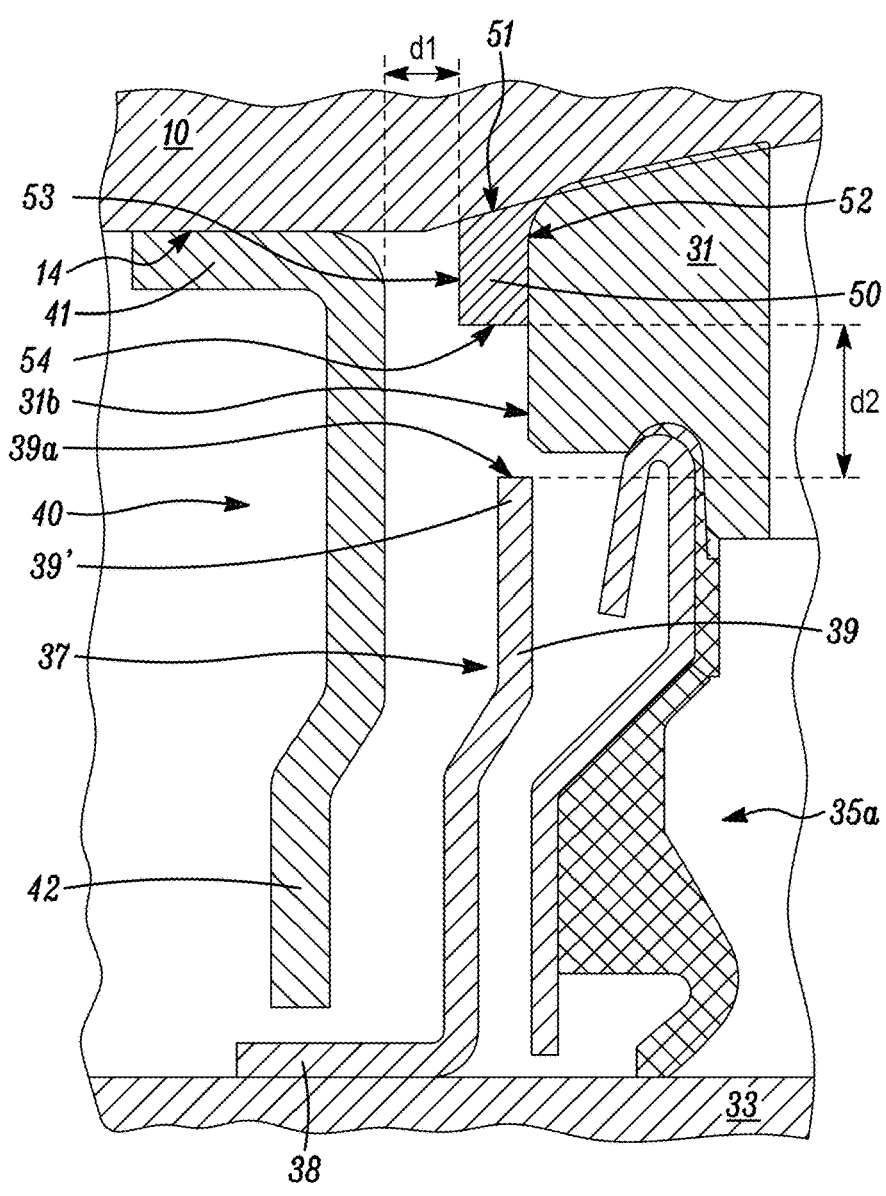
FIG. 2 is an enlarged view of a portion of the support assembly of FIG. 1 according to exemplary embodiments of the present disclosure.

With reference to FIG. 2, bearing unit 30 may include a radially outer ring 31, a radially inner ring 33, and a plurality of rolling elements 32 interposed between radially outer ring 31 and radially inner ring 33 to enable relative rotation of the rings. In some embodiments, radially outer ring 31 may have a convex shape. In some embodiments, radially inner ring 33 may be provided with a fastener 34 at an axially outer end for securing bearing unit 30 to second mechanical element 3 (e.g., rotary shaft 3).

Throughout this disclosure, embodiments of bearing unit 30 are described as including a radially outer ring 31 that is stationary and a radially inner ring 33 that is rotating. However, it will be appreciated by a person of ordinary skill in the art that, in alternative embodiments, radially outer ring 31 may rotate and radially inner ring 33 may be stationary without departing from the scope of this disclosure. The descriptions and teachings of this disclosure can nevertheless be applied to such embodiments.

In some embodiments, radially outer ring 31 may include a convex surface 31' formed on a radially outer surface of outer ring 31 that can be coupled in assembly seat 11. A shape of convex surface 31' can match a shape of assembly seat 11 to facilitate alignment of bearing unit 30 inside casing 10 and allow a potential static misalignment of the shaft 3 mounted through the radially inner ring 33 with respect to the assembly seat 11 or the frame 2 experienced during installation.

In some embodiments, a pair of sealing devices 35 may be arranged on opposing axial ends of bearing unit 30 to prevent ingress of fluids and other contaminants from the external environment into the interior of bearing unit 30. A first sealing device 35a may be arranged on an axially inner end of support assembly 1 adjacent to first mechanical element 2 (e.g., static frame 2) to prevent ingress of washing fluids and other contaminants into the interior of bearing unit 30 and into cylindrical seat 14 and assembly seat 11. A second sealing device 35b may be arranged on an axially outer end of support assembly 1 opposite first mechanical element 2 to prevent ingress of washing fluids and other contaminants into the interior of bearing unit 30.

In some embodiments, each sealing device 35a and 35b may be provided with a respective first shield 37 interference fit on a radially outer surface of inner ring 33. As illustrated in greater detail in FIG. 2, first shield 37 of sealing device 35a may include a radially inner cylindrical portion 38 interference fit onto the radially outer surface of radially inner ring 33 and a shaped flange portion 39 extending in the radially outward direction from cylindrical portion 38. In some embodiments, shaped flange portion 39 may include a radially outer cylindrical surface 39a formed at a radially outer end of shaped flange portion 39 distal to cylindrical portion 38. In some embodiments, a gap may be defined between surface 39a and a radially inner surface of radially outer ring 31.

In some embodiments, sealing device 35a may be provided with a second shield 40 arranged axially inside of first shield 37 of sealing device 35a and interference fit onto internal cylindrical seat 14 of casing 10. Second shield 40 may include a cylindrical portion 41 interference fit onto cylindrical seat 14 of casing 10 and a shaped flange portion 42 connected to cylindrical portion 41 at an axially outer end of cylindrical portion 41. In some embodiments, flange portion 42 may extend radially inward toward cylindrical portion 38 of first shield 37, defining a gap between a radially inner end of flange portion 42 and cylindrical portion 38.

In some embodiments, second shield 40 may be made of a composite material to enable it to be of variable thickness. The composite material used may be, for example, polyether ether ketone (PEEK), due to its rigidity and resistance against external shocks.

In some embodiments, support assembly 1 may include a spacer 50 interposed axially between an axial end surface of outer ring 31 of bearing unit 30 and second shield 40. Spacer 50 helps prevent sliding contact between first shield 37 and second shield 40 of sealing device 35a caused by misalignment of bearing unit 30 when mounted in assembly seat 11. Specifically, spacer 50 helps prevent contact between a radially outer edge 39' of first shield 37 and shaped flange portion 42 of second shield 40. By introducing spacer 50 between second shield 40 and radially outer ring 31, an axial distance between second shield 40 and radially outer ring 31 is reduced such that, when bearing unit 30 is misaligned, spacer 50 makes contact with second shield 40. By contacting second shield 40, spacer 50 prevents first shield 37 from contacting second shield 40 even under significant static misalignment conditions, for example of up to 5° of misalignment.

Because first shield 37 is fixed to rotating inner ring 31, first shield 37 also rotates during use. Thus, when first shield 37 contacts second shield 40 due to misalignment, the sliding contact creates friction that is damaging to both first shield 37 and second shield 40, reducing their operating lives and increasing the chances of a malfunction. In contrast, spacer 50 is fixed to stationary outer ring 31 and second shield 40 is fixed to casing 10, which is also stationary. Thus, contact between spacer 50 and second shield 40 does not cause the same wear to second shield 40 because the contact is between two stationary components.

Figure 3:
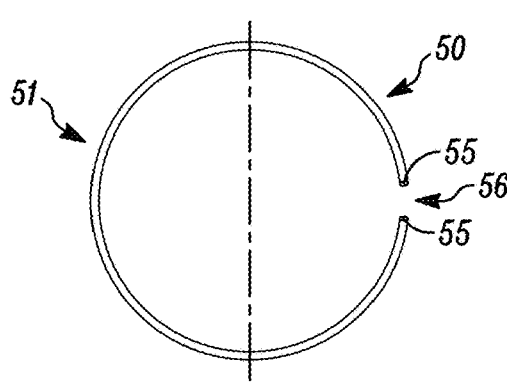
FIG. 3 is a top down view of a spacer according to exemplary embodiments of the present disclosure.

As illustrated in FIG. 3, spacer 50 may be an open ring of a constant radial thickness. In some embodiments, spacer 50 may include a radially external surface 51, which may be conical or spherical, that enables sliding motion of spacer 50 in assembly seat 11 of casing 10 following misalignment of radially outer ring 31 and/or of bearing unit 30. Forming radially external surface 51 as a spherical surface produces an improved sliding effect within seat 11 as compared to a conical finish. On the other hand, forming radially external surface 51 as a conical surface requires a simpler machining process than forming radially external surface 51 as a spherical surface.

In some embodiments, spacer 50 may further include two holes 55 located at either side of an opening 56. Holes 55 may be used to mount spacer 50 in seat 11 of casing using pliers with a 1 mm clamp.

In some embodiments, spacer 50 may be made of metal. In other embodiments, spacer 50 may be made of a material with a high hardness, e.g., at least 80 Shore D, such as, but not limited to, polyether ether ketone (PEEK).

As further illustrated in FIG. 2, spacer 50 may also include an axially outer first annular surface 52, which is in contact with an axially inner annular surface 31b of radially outer ring 31, an axially inner second annular surface 53, and a radially internal cylindrical surface 54. As seen in FIG. 2, radially external surface 51 of spacer 50 may be in sliding contact with assembly seat 11 when assembled.

In some embodiments, spacer 50 may be an axial distance d1 (see FIG. 2) of at least 1 mm from second shield 40. This ensures that a minimum distance of 0.8 mm is maintained between first shield 37 and second shield 40 of sealing device 35a during misalignment.

In some embodiments, under the most extreme static misalignment conditions, spacer 50 may ensure a minimum distance between first shield 37 and second shield 40 by pushing second shield 40 axially inward (i.e., axially toward first mechanical element 2) and away from first shield 37. In order to allow second shield to slide axially inward, an interference between second shield 40 and cylindrical seat 14 of casing 10 onto which second shield 40 is mounted may be between 0.1 mm and 0.2 mm. In some embodiments, to further encourage second shield 40 to slide along cylindrical seat 14, cylindrical seat 14 may be machined to have a roughness of less than 3.2 mm. Furthermore, in some embodiments, forming second shield 40 with a material having a minimum hardness of 80 Shore D further helps encourage sliding of second shield 40 along cylindrical seat 14.

In some embodiments, as a result of spacer 50 pushing second shield 40 in the axially inward direction, an inner axial end of cylindrical portion 41 of second shield 40 may extend beyond annular surface 15 of casing 10. To ensure adequate sealing effect of second shield 40, it is beneficial to maintain an axial extension of second shield 40 beyond annular surface 15 of less than 0.5 mm.

Another important requirement is to prevent spacer 50 from contacting first shield 37 of sealing device 35, as this would create a sliding contact between spacer 50, which is stationary, and first shield 37, which is rotating. As with second shield 40, contact between spacer 50 and first shield 37 causes wear to spacer 50 because first shield 37 rotates with inner ring 31. Thus, in some embodiments, in order to prevent contact between spacer 50 and first shield 37, a radial distance d2 between cylindrical surface 54 of spacer 50 and cylindrical surface 39a of first shield 37 may be at least 2 mm. This ensures sufficient radial distance between spacer 50 and first shield 37 even during significant misalignment, e.g., of up to 5°.

Figure 4:
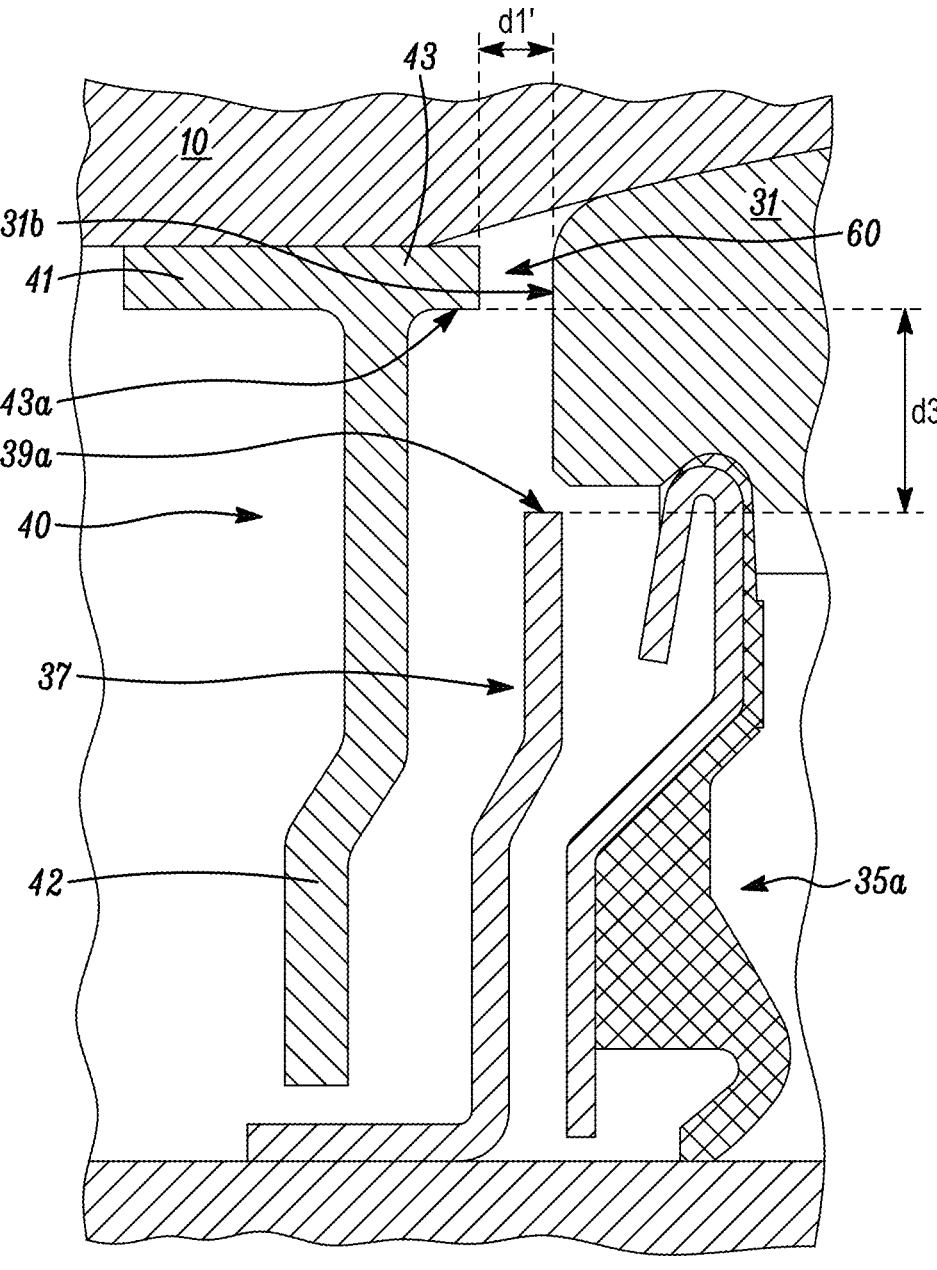
FIG. 4 is an enlarged cross section view of a portion of a support assembly according to exemplary embodiments of the present disclosure.
Figure 5:
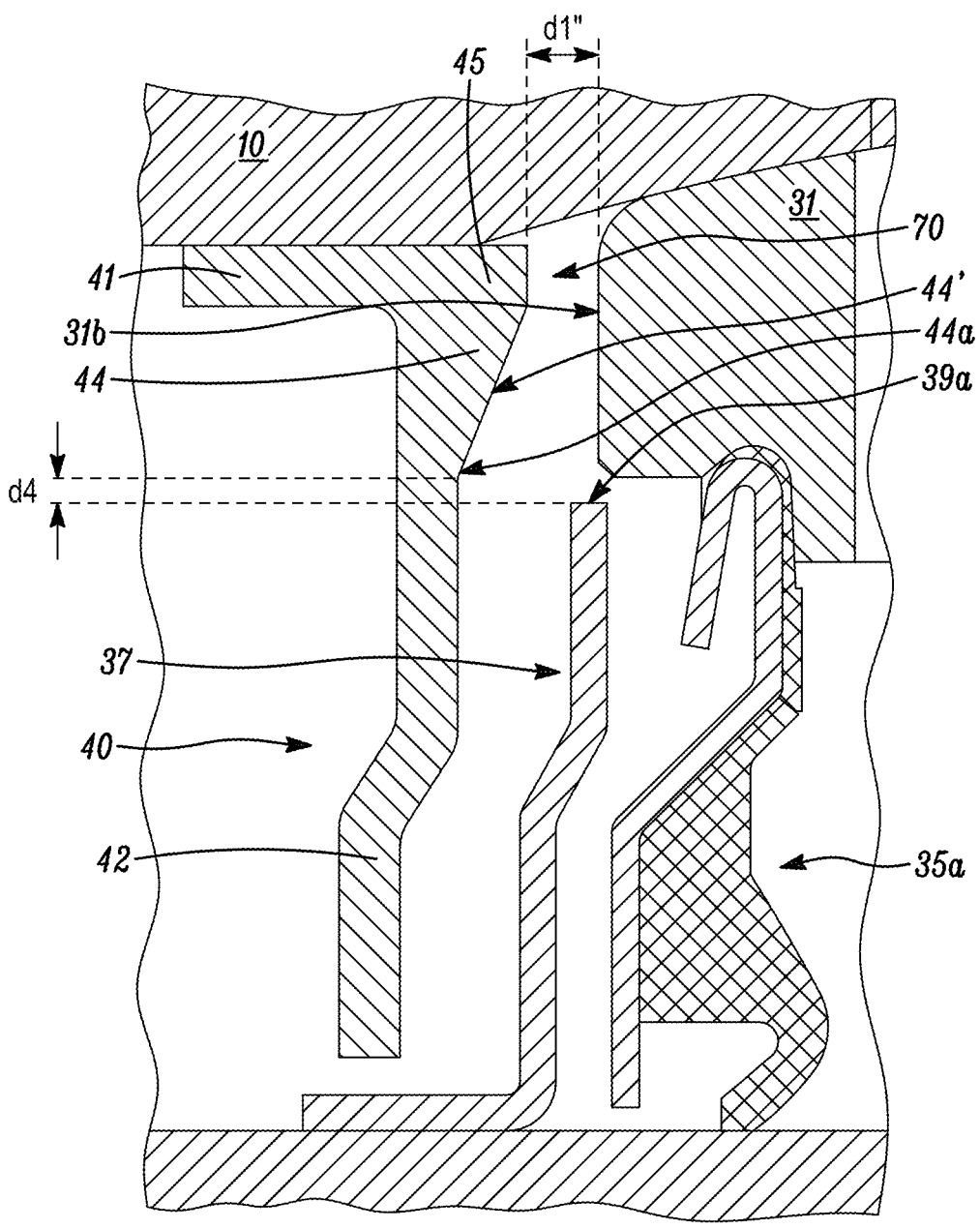
FIG. 5 is an enlarged cross section view of a portion of a support assembly according to exemplary embodiments of the present disclosure.

In some embodiments, such as those illustrated in FIGS. 4 and 5, support assembly 1 may include a spacer, e.g., spacer 60 or spacer 70, respectively, that is integral with second shield 40. These embodiments simplify assembly, as only one component, second shield 40, need be installed, as opposed to two components, second shield 40 and spacer 50.

With reference to FIG. 4, in some embodiments, second shield 40 may include a spacer 60 formed integrally with second shield 40 to define an axially outer annular end 43 of cylindrical portion 41. In some embodiments, annular end 43 may extend axially beyond an axially outer surface of flange portion 42, defining a radially internal cylindrical surface 43a of annular end 43. Thus, during misalignment, spacer 60 may contact axially inner annular surface 31b of radially outer ring 31 to prevent contact between second shield 40 and first shield 37. In some embodiments, an axial distance d1' between annular end 43 and axially inner annular surface 31b of radially outer ring 31 may be at least 1 mm. This ensures that a minimum distance of 0.8 mm is maintained between first shield 37 and second shield 40 of sealing device 35a during misalignment. Furthermore, in some embodiments, contact between spacer 60 and radially outer ring 31 may cause second shield 40 to slide axially inward to further prevent contact between first shield 37 and second shield 40 during misalignment.

Furthermore, as with spacer 50, it is important to prevent contact between first shield 37 and spacer 60 during misalignment because the sliding contact between first shield 37 and spacer 60 will cause wear and decrease the operating life of second shield 40. In order to prevent this contact, in some embodiments, a radial distance d3 between radially internal cylindrical surface 43a of annular end 43 and cylindrical surface 39a of first shield 37 may be at least 2 mm.

With reference to FIG. 5, in some embodiments, support assembly 1 may include a second shield 40 that includes a spacer 70 formed integrally therewith. Spacer 70 may include a radially outer edge 44 formed integrally with flange portion 42 and a corner 45 formed at an axially outer end of cylindrical portion 41. Radially outer edge 44 may have an axial thickness that increases in a radially outward direction along a conical surface 44' from a radially inner end 44a to a maximum axial thickness at corner 45 that extends beyond an axially outer surface of flange portion 42 before radially inner end 44a. Thus, spacer 70 may contact axially inner annular surface 31b of radially outer ring 31 during misalignment to prevent first shield 37 from contacting second shield 40. In some embodiments, an axial distance d1" between corner 45 and axially inner annular surface 31b of radially outer ring 31 may be at least 1 mm. This ensures that a minimum distance of 0.8 mm is maintained between first shield 37 and second shield 40 of sealing device 35a during misalignment. Furthermore, in some embodiments, contact between spacer 70 and radially outer ring 31 may cause second shield 40 to slide axially inward to further prevent contact between first shield 37 and second shield 40 during misalignment.

Forming spacer 70 integral with second shield 40 requires a simpler mold as compared to forming spacer 60 integral with second shield 40 because spacer 70 has fewer 90° angles than spacer 60.

Furthermore, as with spacers 50 and 60, it is important to prevent spacer 70 from contacting first shield 37 during misalignment, as the sliding contact between rotating first shield 37 and stationary spacer 70 may cause wear to spacer 70 and reduce the operating life of second shield 40. Thus, in some embodiments, a radial distance d4 between radially inner end 44a of radially outer edge 44 of spacer 70 and cylindrical surface 39a of first shield 37 may be greater than a predetermined value required to prevent contact between first shield 37 and spacer 70 under even significant misalignment, e.g., up to 5° of static misalignment.

It will be appreciated by a person of ordinary skill in the art that spacers 60 and 70 illustrated in FIGS. 4 and 5 are merely exemplary embodiments of a spacer formed integrally with a second shield 40. Numerous other embodiments of a spacer comprising a different shape and/or thickness are within the scope of this disclosure, which is not meant to be limiting to the exemplary embodiments described.

In summary, each of spacer 50, 60, and 70 prevents sliding contact between a first shield 37 and a second shield 40 of a sealing device 35a, even under significant static misalignment conditions, for example of up to 5°.

It is understood that there are numerous other variants of the disclosure in addition to the embodiments described above. These embodiments should also be understood to be examples that do not limit the scope, applications or possible configurations of the disclosure. Indeed, although the description provided above enables the person skilled in the art to carry out the present disclosure at least according to one example configuration thereof, numerous variations of the components described could be used without departing from the scope of the disclosure, as defined in the attached claims, interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

The invention claimed is:

1. A support assembly comprising:
a bearing unit having an axis of rotation;
a casing having an axially inner end and an axially outer end spaced apart along the axis of rotation, the casing comprising an internal assembly seat and a cylindrical seat formed on an axially inner side of the internal assembly seat, the bearing unit being mounted within the internal assembly seat of the casing, the bearing unit comprising:
a stationary radially outer ring inserted in the assembly seat of the casing and comprising an axially inner annular surface; and
a rotating radially inner ring;
a sealing device comprising:
a first shield interference fitted onto a radially outer surface of the radially inner ring; and
a second shield arranged on an axially inner side of the first shield and interference fit onto the cylindrical seat of the casing; and
a spacer positioned axially between the radially outer ring and the second shield, the spacer being slidable axially inward along the casing in response to a misalignment of the bearing unit within the assembly seat of the casing.

2. The support assembly of claim 1, wherein;
the spacer comprises an open ring shape with an opening separating two annular ends of the open ring;
the spacer is received within the assembly seat of the casing in a position axially inward of the radially outer ring; and
an axially outer surface of the spacer abuts the axially inner annular surface of the radially outer ring.

3. The support assembly of claim 2, wherein;
the spacer further comprises a radially external surface comprising one of a conical shape or spherical shape; and
the radially external surface is configured to slide axially inward along the assembly seat of the casing so that the spacer contacts the second shield due to the misalignment of the bearing unit within the assembly seat of the casing.

4. The support assembly of claim 3, wherein the second shield is slidable in an axially inward direction along the cylindrical seat of the casing by up to 2 mm when the spacer pushes against the second shield due to the misalignment of the bearing unit within the assembly seat of the casing.

5. The support assembly of claim 3, wherein the spacer is separated from the first shield by a radial distance of at least 2 mm.

6. The support assembly of claim 2, wherein the spacer is separated from the second shield by an axial distance of at least 1 mm.

7. The support assembly of claim 6, wherein the spacer comprises a hardness of at least 80 Shore D.

8. The support assembly of claim 2, wherein the spacer further comprises a pair of holes opposite the opening.

9. The support assembly of claim 2, wherein the spacer is made of a metallic material.

10. The support assembly of claim 2, wherein the spacer is made of polyether ether ketone.

11. The support assembly of claim 1, wherein the second shield is made of polyether ether ketone.

12. The support assembly of claim 1, wherein assembly seat of the casing has a concave shape.

13. The support assembly of claim 1, wherein the bearing unit includes a plurality of balls between the radially outer ring and the radially inner ring.

14. The support assembly of claim 1, wherein the first shield and the spacer define a radial gap therebetween.

15. A support assembly comprising:

a bearing unit having an axis of rotation;

a casing having an axially inner end and an axially outer end spaced apart along the axis of rotation, the casing comprising an internal assembly seat and a cylindrical seat formed on an axially inner side of the internal assembly seat, the bearing unit being mounted within the internal assembly seat of the casing, the bearing unit comprising:

a stationary radially outer ring inserted in the assembly seat of the casing and comprising an axially inner annular surface; and a rotating radially inner ring; and a sealing device comprising:

a first shield interference fitted onto a radially outer surface of the radially inner ring; and a second shield arranged on an axially inner side of the first shield and interference fit onto the cylindrical seat of the casing, the second shield comprising:

a cylindrical portion mounted onto the cylindrical seat of the casing;

a shaped flange portion extending radially inward from the cylindrical portion; and a spacer formed integrally with an axially outer end of the cylindrical portion, wherein the spacer extends axially outward from the cylindrical mounting portion and beyond an axially outer surface of the shaped flange portion.

16. The support assembly of claim 15, wherein;

the spacer further comprises a radially inner surface;

a radial distance between the radially inner surface of the spacer and the first shield is at least 2 mm; and an axial distance between the spacer and the radially outer ring is at least 1 mm.

17. The support assembly of claim 15, wherein the second shield is slidable in an axially inward direction along the cylindrical seat of the casing by up to 2 mm when the radially outer ring pushes against the spacer due to a misalignment of the bearing unit within the assembly seat of the casing.

18. The support assembly of claim 17, wherein the second shield comprises a hardness of at least 80 Shore D.

19. A support assembly comprising:

a bearing unit having an axis of rotation;

a casing having an axially inner end and an axially outer end spaced apart along the axis of rotation, the casing comprising an internal assembly seat and a cylindrical seat formed on an axially inner side of the internal assembly seat, the bearing unit being mounted within the internal assembly seat of the casing, the bearing unit comprising:

a stationary radially outer ring inserted in the assembly seat of the casing and comprising an axially inner annular surface; and a rotating radially inner ring; and a sealing device comprising:

a first shield interference fitted onto a radially outer surface of the radially inner ring; and a second shield arranged on an axially inner side of the first shield and interference fit onto the cylindrical seat of the casing, the second shield comprising:

a cylindrical portion mounted onto the cylindrical seat of the casing;

a shaped flange portion extending radially inward from the cylindrical portion; and a spacer formed integrally with an axially outer end of the cylindrical portion and a radially outer end of the shaped flange portion, the spacer comprising:

a corner; and a radially outer edge extending from the corner to a radially inner end, wherein an axial thickness of the radially outer edge increases in a radially outward direction from the radially inner end to the corner.

20. The support assembly of claim 19, wherein the second shield is slidable in an axially inward direction along the cylindrical seat of the casing by up to 2 mm when the radially outer ring pushes against the spacer due to a misalignment of the bearing unit within the assembly seat of the casing.

21. The support assembly of claim 20, wherein the first shield comprises a radially outer end separated from the radially inner end of the radially outer edge of the spacer by a radial distance.

22. The support assembly of claim 21, wherein the spacer comprises a hardness of at least 80 Shore D.

23. The support assembly of claim 21, wherein the spacer is separated from the radially outer ring an axial distance of at least 1 mm.

* * * * *